H. RABBA & F. STOCK.
WHEEL.
APPLICATION FILED FEB. 21, 1912.
1,089,959.
Patented Mar. 10, 1914.
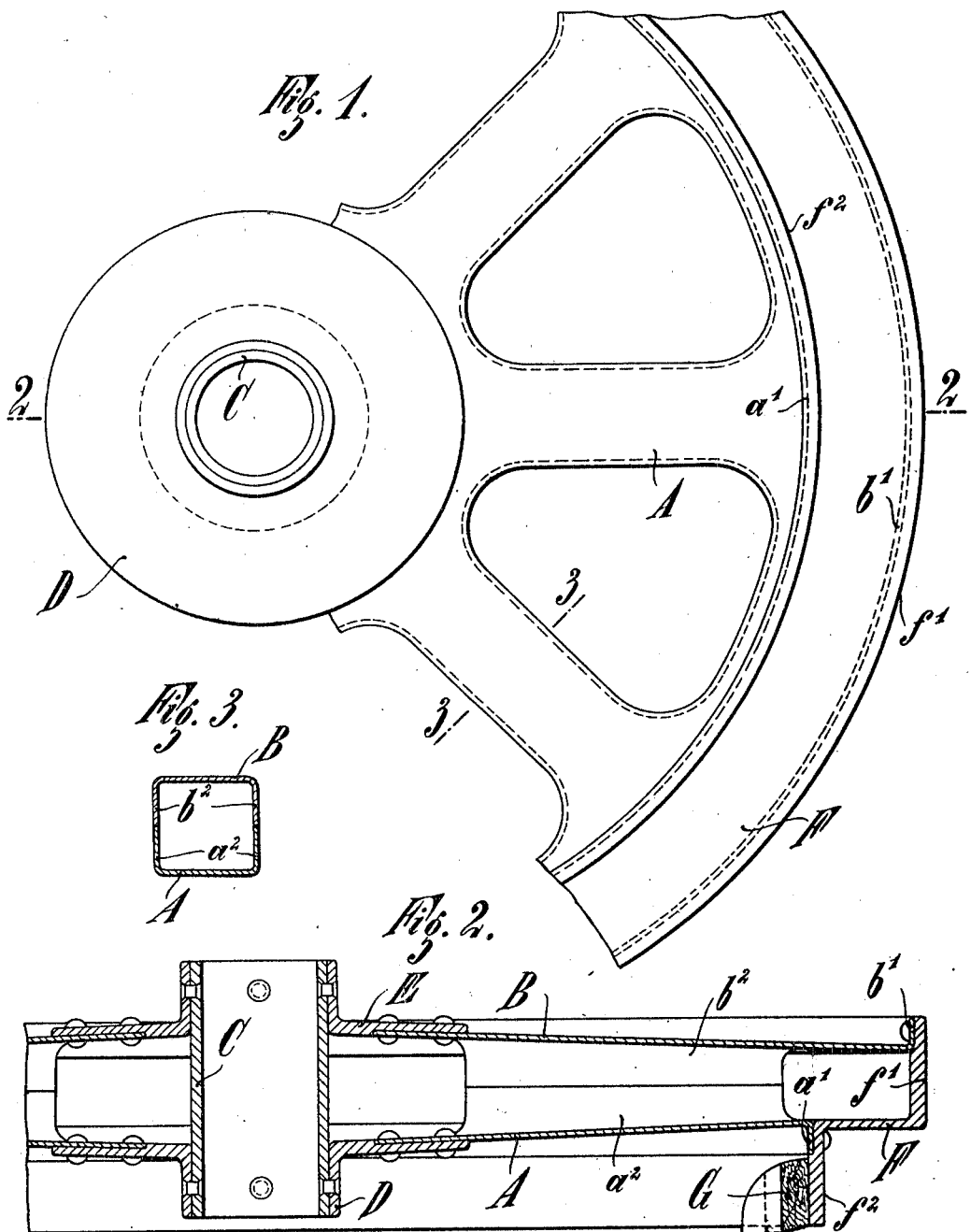

UNITED STATES PATENT OFFICE.

HEINRICH RABBA AND FRIEDRICH STOCK, OF ESSEN-ON-THE-RUHR, GERMANY, ASSIGNORS TO FRIED. KRUPP AKTIENGESELLSCHAFT, OF ESSEN-ON-THE-RUHR, GERMANY.

WHEEL.

1,089,959.  Specification of Letters Patent.  Patented Mar. 10, 1914.

Application filed February 21, 1912. Serial No. 679,179.

*To all whom it may concern:*

Be it known that we, HEINRICH RABBA and FRIEDRICH STOCK, residing at Essen-on-the-Ruhr, Germany, both subjects of the Emperor of Germany, have invented a certain new and useful Improvement in Wheels, of which the following is a specification.

This invention relates to wheels, having a special ring for the brake, and has for its object to provide a wheel of this kind which combines great strength and small weight with cheapness of manufacture.

One embodiment of the invention is illustrated in the accompanying drawing, representing a wheel composed of two wheel halves and made of plate, and Figure 1 is an elevation of a part of the wheel; Fig. 2 a section on line 2—2 of Fig. 1 with parts of the wheel brake; and Fig. 3 a section on line 3—3 of Fig. 1.

Each of the wheel halves A and B is stamped out of thin plate and consist of a hub part, a spoke part connected therewith, and a flange $a^1$ and $b^1$ respectively at the circumference. The openings between the spokes are inclosed by flanges $a^2$ and $b^2$ which may be conveniently connected together by welding. The hub consists of a sleeve C and two hub disks D and E. The latter receive the wheel halves A and B between them, and are connected thereto by rivets or the like.

The rim F has a Z-shaped cross-section and is produced in one piece. The outer limb $f^1$ of the wheel rim F, forms the tread of the wheel, while the inner limb $f^2$ serves as brake ring for the wheel brake. Of the latter is shown in Fig. 2, a part of the brake-lever H carrying the brake block G. The connection of the wheel halves A and B with the wheel rim F is accomplished by means of rivets or the like, securing the flange $a^1$ of the wheel half A to the inner limb $f^2$ of the wheel rim, and the flange $b^1$ of the wheel half B to the outer limb $f^1$ thereof.

The described wheel comprises small weight with great strength and small manufacturing cost. It furthermore offers the advantage that the combined wheel rim and brake ring may be easily exchanged.

We claim:—

1. A wheel comprising a hub, a spoke part consisting of front and rear members, and a rim Z-shaped in cross section providing outer and inner limbs; one member of the spoke part being secured to the outer limb of the rim and the other member of the spoke part being connected to the inner limb of the rim.

2. A wheel comprising a hub, a spoke part and a rim; said spoke part consisting of a front half and a rear half, each stamped out of plate, a flange around the periphery of each half of the spoke part; said rim being of Z-shaped cross-section, the outer limb forming the tread of the wheel and the inner limb forming a brake ring; the flange of one of said spoke halves being secured to the tread limb of said rim, the flange of the other spoke half secured to the brake ring of said rim, and the center part of both spoke halves secured to the hub.

The foregoing specification signed at Barmen, Germany, this 31st day of January, 1912.

HEINRICH RABBA. [L. S.]
FRIEDRICH STOCK. [L. S.]

In presence of—
HELEN NUFER,
CHAS. J. WRIGHT.